(12) United States Patent
Hakura et al.

(10) Patent No.: US 7,461,211 B2
(45) Date of Patent: Dec. 2, 2008

(54) SYSTEM, APPARATUS AND METHOD FOR GENERATING NONSEQUENTIAL PREDICTIONS TO ACCESS A MEMORY

(75) Inventors: Ziyad S. Hakura, Mountain View, CA (US); Brian Keith Langendorf, Benicia, CA (US); Stefano A. Pescador, Sunnyvale, CA (US); Radoslav Danilak, Santa Clara, CA (US); Brad W. Simeral, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 397 days.

(21) Appl. No.: 10/920,682

(22) Filed: Aug. 17, 2004

(65) Prior Publication Data

US 2006/0041721 A1 Feb. 23, 2006

(51) Int. Cl.
*G06F 12/10* (2006.01)
*G06F 7/38* (2006.01)

(52) U.S. Cl. .................. 711/137; 711/128; 712/239
(58) Field of Classification Search ............... None
See application file for complete search history.

(56) References Cited

U.S. PATENT DOCUMENTS

| | | | |
|---|---|---|---|
| 5,561,782 A | 10/1996 | O'Connor | |
| 5,623,608 A | 4/1997 | Ng | |
| 6,185,554 B1* | 2/2001 | Bennett | 707/3 |
| 6,678,792 B2* | 1/2004 | van de Waerdt | 711/128 |
| 6,789,171 B2 | 9/2004 | Desai et al. | |
| 2002/0023204 A1* | 2/2002 | Barowski et al. | 712/239 |

OTHER PUBLICATIONS

U.S. Appl. No. 09/791,417, filed Feb. 23, 2001, Unkown.
U.S. Appl. No. 10/674,618, filed Sep. 29, 2003, Radoslav Danilak.
U.S. Appl. No. 10/712,520, filed Nov. 12, 2003, Radoslav Danilak.
The ISR for PCT Application No. US/05/29135 and mailed on Jun. 16, 2006 (4 pages).

* cited by examiner

Primary Examiner—Kevin L Ellis
Assistant Examiner—Duc T Doan
(74) Attorney, Agent, or Firm—Cooley Godward Kronish LLP

(57) ABSTRACT

A system, apparatus, and method are disclosed for storing and prioritizing predictions to anticipate nonsequential accesses to a memory. In one embodiment, an exemplary apparatus is configured as a prefetcher for predicting accesses to a memory. The prefetcher includes a prediction generator configured to generate a prediction that is unpatternable to an address. Also, the prefetcher also can include a target cache coupled to the prediction generator to maintain the prediction in a manner that determines a priority for the prediction. In another embodiment, the prefetcher can also include a priority adjuster. The priority adjuster sets a priority for a prediction relative to other predictions. In some cases, the placement of the prediction is indicative of the priority relative to priorities for the other predictions. In yet another embodiment, the prediction generator uses the priority to determine that the prediction is to be generated before other predictions.

15 Claims, 6 Drawing Sheets

SYSTEM, APPARATUS AND METHOD FOR GENERATING NONSEQUENTIAL PREDICTIONS TO ACCESS A MEMORY

BRIEF DESCRIPTION OF THE INVENTION

This invention relates generally to computing systems and their memory, and more particularly, to storing and prioritizing predictions for anticipating nonsequential accesses to a memory.

BACKGROUND OF THE INVENTION

Prefetchers are used to fetch program instructions and program data so that a processor can readily avail itself of the retrieved information as it is needed. The prefetcher predicts which instructions and data the processor might use in the future so that the processor need not wait for the instructions or data to be accessed from system memory, which typically operates at a slower rate than the processor. With a prefetcher implemented between a processor and system memory, the processor is less likely to remain idle as it waits for requested data from memory. As such, prefetchers generally improve processor performance.

Generally, the more predictions generated by a prefetcher, the more likely that the prefetcher can arrange to have the necessary instructions and data available for a processor, thereby decreasing the latency of a processor. But with some conventional prefetchers, predictions typically are generated without regard to the costs of implementing such prediction processes, thereby failing to realize the benefits from streamlining the prediction process and the amount of resources necessary for supporting it. As an example, some traditional prefetchers store predictions in a manner that does not conserve resources, whether computational or otherwise. In particular, these types of prefetchers primarily rely on standard techniques to produce predictions that are sequential in nature.

In view of the foregoing, it would be desirable to provide a system, an apparatus and a method for minimizing the drawbacks of implementing standard techniques of generating predictive accesses to memory.

SUMMARY OF THE INVENTION

A system, apparatus, and method are disclosed for storing and prioritizing predictions to anticipate nonsequential accesses to a memory. In one embodiment, an exemplary apparatus is configured as a prefetcher for predicting accesses to a memory. The exemplary prefetcher includes a prediction generator configured to generate a prediction that is unpatternable to an address. Also, the prefetcher also can include a target cache coupled to the prediction generator to maintain the prediction in a manner that determines a priority for the prediction. In another embodiment, the prefetcher can also include a priority adjuster. The priority adjuster sets a priority for a prediction relative to other predictions. In some cases, the placement of the prediction is indicative of the priority relative to priorities for the other predictions. In yet another embodiment, the prediction generator uses the priority to determine that the prediction is to be generated before other predictions.

In another embodiment, an exemplary nonsequential predictor anticipates accesses to a memory. The nonsequential predictor includes a prediction generator configured to generate indexes and tags from addresses. Also, the nonsequential predictor includes a target cache coupled to the prediction generator. The target cache includes a number of portions of memory each having memory locations for storing trigger-target associations. A trigger-target association stored in a first portion of memory is associated with a higher priority than another trigger-target association stored in a second portion of memory.

In yet another embodiment of the present invention, an exemplary method for generating nonsequential predictions to access a memory is disclosed. This method comprises accessing a target cache in response to receiving a first address, identifying target addresses associated with the first address, and selecting a subset of the target addresses based on priorities, each of the target addresses having a corresponding priority.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 1:
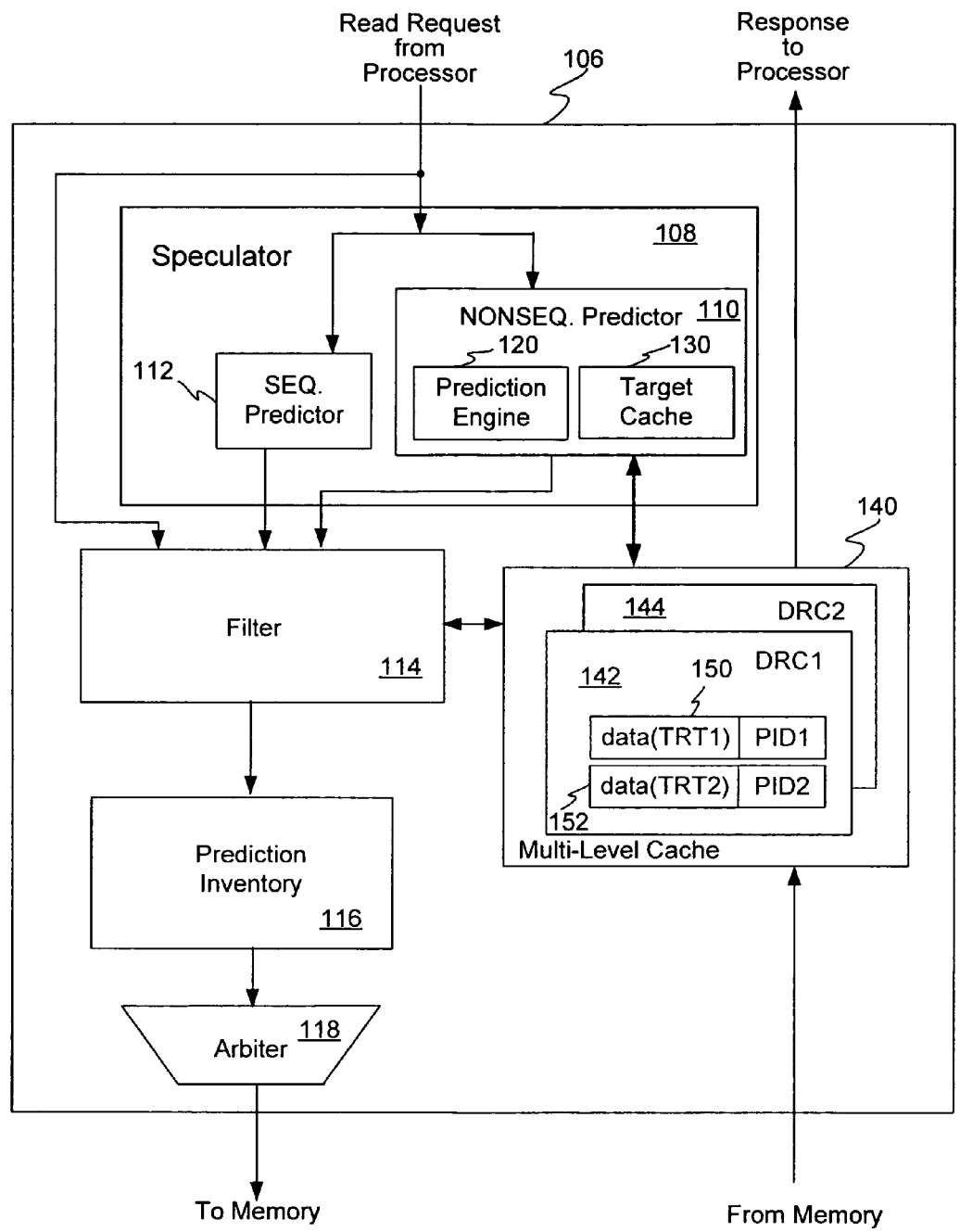
FIG. 1 is a block diagram illustrating a prefetcher implementing an exemplary nonsequential predictor, according to a specific embodiment of the present invention.

FIG. 1 is a block diagram illustrating an exemplary nonsequential ("NONSEQ") predictor 110, according to a specific embodiment of the present invention. In this example, nonsequential predictor 110 is shown to reside within a speculator 108, which also includes a sequential predictor 112 for generating sequential predictions. Prefetcher 106, which includes speculator 108, operates to "fetch" both program instructions and program data from a memory before being required (not shown), and then provide the fetched program instructions and program data to a processor upon request by that processor (not shown). By fetching them prior to use (i.e., "prefetching"), processor idle time (e.g., the time during which the processor is starved of data) is minimized. Nonsequential predictor 110 includes a nonsequential prediction engine ("Prediction Engine") 120 for generating predictions and a target cache 130 for storing and prioritizing predictions.

Prefetcher 106 also includes a filter 114, an optional prediction inventory 116, an optional arbiter 118, and a multi-level cache 140. Here, filter 114 includes a cache filter (not shown) configured to compare newly-generated predictions to those previous predictions that caused program instructions and program data to be already prefetched into multi-level cache 140. So if any of the newly-generated predictions is redundant to any previously-generated prediction that is stored in multi-level cache 140, then that redundant prediction is voided so as to minimize the number of predictions, thereby freeing up prefetcher resources. Prediction inventory 116 provides a temporary storage for storing generated predictions until selected by arbiter 118 to access a memory. Arbiter 118 is configured to determine which of the generated predictions are to be issued for accessing the memory to prefetch instructions and data.

Multi-level cache 140 is composed of a first level data return cache ("DRC1") 142 and a second level data return cache ("DRC2") 144. First level data return cache 442 can generally be described as a short-term data store and second level data return cache 144 can generally be described as a long-term data store. According to an embodiment of the present invention, either first level data return cache 142 or second level data return cache 144, or both, can store prefetched program instructions and program data prefetched based on a predicted address (i.e., a target address). As shown, the prefetched predictive information stored in multi-level cache 140 is represented as data(TRT1) and data(TRT2). This notation means that target addresses TRT1 and TRT2 have contributed to prefetching data representing predictive information. As shown, and as will be discussed below, data (TRT1) and data(TRT2) are stored in multi-level cache 140 with prediction identifiers ("PIDs") 1 and 2, respectively. When either data(TRT1) or data(TRT2) is requested by a processor, the corresponding target address (e.g., TRT1) and prediction identifier will be communicated to nonsequential predictor 110.

In operation, speculator 108 monitors a system bus as a processor requests access ("read requests") to a memory. As the processor executes program instructions, speculator 108 detects read requests for addresses that contain program instructions and program data yet to be used by the processor. For purposes of discussion, an "address" is associated with a cache line or unit of memory that is generally transferred between a memory and a cache memory, such as multi-level cache 140. Note that a cache memory is an example of a repository external to target cache 130. An "address" of a cache line can refer to a memory location, and the cache line can contain data from more than one address of the memory. The term "data" refers to a unit of information that can be prefetched, whereas the terms "program instructions" and "program data" respectively refer to instructions and data used by the processor in its processing. So, data (e.g., any number of bits) can represent predictive information constituting program instructions and/or program data. Also, the term "prediction" can be used interchangeably with the term "predicted address." When a predicted address is used to access the memory, one or more cache lines containing that predicted address, as well as other addresses (predicted or otherwise), is typically fetched.

Based on detected read requests, nonsequential predictor 110 can generate a configurable number of predicted addresses that might likely be requested next by the processor. In particular, nonsequential predictor 110 is configured to generate one or more predictions (i.e., predicted addresses) subsequent to its detections of an address, even when that address is within a nonlinear stream of read requests. Typically, when there is no observable pattern of requested addresses upon which to predict a next address, predictions based on the preceding address alone is difficult. But in accordance with an embodiment of the present invention, nonsequential prediction engine 120 generates nonsequential predictions, which include predicted addresses that are unpatternable from one or more preceding addresses. An "unpatternable" prediction is a prediction that cannot be patterned with or is irregular to a preceding address. One type of unpatternable prediction is the nonsequential prediction. A preceding address upon which a nonsequential prediction is based can be either an immediate address or any address configured as a trigger address. Notably, a lack of one or more patterns over two or more addresses in a stream of read requests is indicative of a processor executing program instructions in a somewhat scattershot fashion in terms of fetching instructions and data from various spatial locations of memory locations.

Nonsequential predictor 110 includes a target cache 130 as a repository for storing an association for a preceding address to one or more potential nonsequential addresses that can each qualify as a nonsequential prediction. Target cache 130 is designed to compare its contents against incoming detected addresses for generating nonsequential predictions in an expeditious manner. Moreover, target cache 130 is configured to prioritize those nonsequential predictions in response to, for example, a hit in a cache memory. Or, nonsequential predictor 110 can prioritize the first instance of establishing an association between a new nonsequential prediction and a particular trigger address. A "trigger" address is a detected address from which nonsequential predictor 110 generates a nonsequential prediction with the resulting prediction referred to as a "target" of the unpatternable association between the two. Note that in accordance with at least one embodiment of the present invention, target cache 130 can be a single-ported memory to conserve resources that otherwise would be used by multi-ported memories.

After prefetcher 106 issues the predictions from nonsequential predictor 110, the nonsequential predictions are used to access the memory. In response, the memory returns prefetched data with references relating to the predicted addresses, where the references can include a prediction identifier ("PID") and a corresponding target address. Thereafter, multi-level cache memory 140 temporarily stores the returned data until such time that the processor requests it. As is described below, when the processor does request the prefetched data (i.e., predictive information) a reference is sent to nonsequential predictor 110 for readjusting a priority of a nonsequential prediction, if necessary.

According to a specific embodiment of the present invention, a suitable data store for implementing multi-level cache 140, in whole or in part, as well as a suitable a cache filter, is described in U.S. patent application Ser. No. 10/920,995 filed on Aug. 17, 2004 titled "System, Apparatus and Method for Performing Look-Ahead Look Up in Prefetcher Caches" which is incorporated by reference in its entirety, for all purposes. In one embodiment, nonsequential predictor 110 of FIG. 1 is disposed in a speculator configured to also generate forward sequential predictions, reverse sequential predictions, back blind sequential predictions, back sector sequential predictions, nonsequential predictions, and the like. As such, a suitable speculator in which nonsequential predictor 110 resides, in whole or in part, is described in U.S. patent application Ser. 10/921,026 filed on Aug. 17, 2004, titled "System, Apparatus and Method for Predicting Accesses to a Memory" which is incorporated by reference in its entirety for all purposes. And according to at least one specific embodiment of the present invention, a suitable prediction inventory for implementing prediction inventory 114, in whole or in part, is described in U.S. patent application Ser. No. 10/920,610 filed on Aug. 17, 2004, titled "System, Apparatus and Method for Issuing Predictions from an Inventory to Access a Memory" which is incorporated by reference in its entirety for all purposes.

Figure 2:
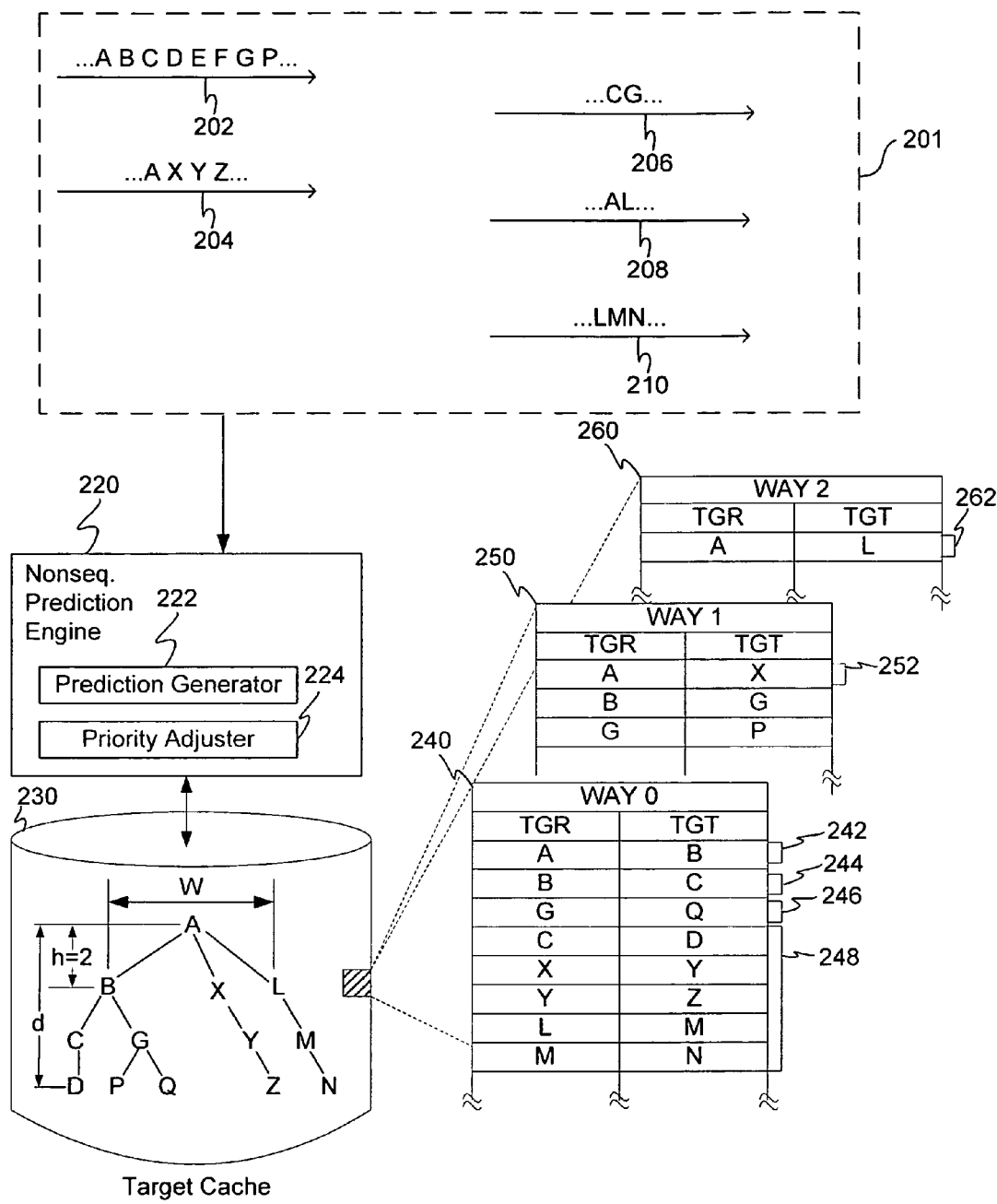
FIG. 2 depicts an exemplary nonsequential predictor in accordance with one embodiment of the present invention.

FIG. 2 illustrates an exemplary nonsequential predictor 110, according to one embodiment of the present invention.

Nonsequential predictor 110 includes a nonsequential prediction engine ("NonSeq. Prediction Engine") 220 operably coupled to a repository, as exemplified by target cache 230. Further, nonsequential prediction engine 220 includes a prediction generator 222 and a priority adjuster 224. Prediction generator 222 generates predictions and manages trigger-target associations stored in target cache 230. Priority adjuster 424 operates to prioritize the trigger-target associations, for example, from the most recent, successful target addresses to the least recent or successful. Prediction generator 222 and a priority adjuster 224 are described more thoroughly in FIGS. 3 and 4, respectively.

Target cache 230 maintains associations between each trigger address ("TGR") and one or more corresponding target addresses ("TRTs"). Note that FIG. 2 shows one of many ways with which to associate nonsequential addresses. Here, a tree structure relates a specific trigger address to its corresponding target addresses. In this example, target cache 230 includes address "A" as a trigger address from which to form associations to addresses of possible nonsequential predictions, such as addresses "B," "X," and "L." These three target addresses are also trigger addresses for respective addresses "C" and "G," "Y," and "M." The formation and operation of target cache 230 is discussed in more detail below, especially when prediction generator 222 discovers a new trigger-target association and inserts that association in target cache 230. Note that address "A" can also be a target address for a trigger address that is not shown in FIG. 2. Moreover, many other associations are also possible among addresses that are not shown.

As is shown, target cache 230 can be constructed, for example, by nonsequential prediction engine 220 in accordance with at least three variables: width ("w"), depth ("d"), and height ("h"), according to one embodiment of the present invention. Width, w, sets the number of possible targets from which a trigger address can predict, and depth, d, sets the number of levels associated with a trigger address. Height, h, sets the number of successive trigger addresses that are used to generate nonsequential predictions. As an example, consider that d indicates a depth of "four." This means that address A is at a first level, address B is at a second level, addresses C and G are at a third level, and address D is at fourth level. As another example, consider that w is set to "two." This means only two of the three addresses "B," "X," and "L" are used for nonsequential prediction as leg 0 and leg 1, all three addresses being of the second level. In a specific embodiment, variable h sets the number of levels beyond just the first level to effectuate multi-level prediction generation.

Consider that h is set to 2 as is shown in FIG. 2. This means that there are two levels of trigger addresses—a trigger address in the first level (e.g., address A) and a successive trigger address in the second level (e.g., address B). So with h set to 2, a first grouping of predictions is formed in response to trigger address A. That is, any of those target addresses of the second level can generate one or more groups of nonsequential addresses. For instance, any of addresses "B," "X," and "L" can be a basis for generating nonsequential predictions, where the number of these addresses are selected by the number of active legs (e.g., leg 0 through leg 2) defined by nonsequential prediction engine 220. But in accordance with multi-level prediction generation (and with h set to 2), addresses "B," "X," and "L" could each be a successive trigger address for generating a second grouping of predictions based on target address of the next level down. Accordingly, target addresses C and G of the third level can be used to generate additional nonsequential predictions based on successive trigger address B. Similarly, target addresses Y and M can also be used to generate nonsequential predictions based on successive trigger addresses X and L, respectively. One having ordinary skill in the art should appreciate that there are many implementations possible by varying one or more of the three aforementioned variables.

Nonsequential prediction engine 220 is configured to receive exemplary addresses 201 of read requests. FIG. 2 conceptually depicts nonsequential address streams 202, 204, 206, 208 and 210, each of which includes an address that is unpatternable to a previously detected address. For example, stream 202 includes address "A" followed by address "B," which in turn is followed by address "C." As is the case with nonsequential addresses, detecting a pattern to predict "B" from "A," and to predict "C" from "B" is a difficult proposition without more than just monitoring read requests 201. To this end, prediction generator 222 establishes the contents of target cache 230 to enable the prediction of unpatternable associations between a specific trigger address and its target addresses. For example, upon detecting address A (as well as subsequent addresses) of stream 202, prediction generator 222 populates target cache 230 with associations, such as an association from A to B, an association from B to C, an association from C to D, etc. Nonsequential prediction engine 220 does the same when it detects addresses of other streams 204, 206, etc.

In accordance with a specific embodiment, target cache 230 stores these associations in tabular form, such as tables 240, 250 and 260. These tables include a trigger column ("TGR") and a target column ("TGT") for respectively storing a trigger address and a target address. Next consider that addresses 201 of all the streams are stored in tables 240, 250 and 260. As shown in table 240, trigger-target associations 242, 244, and 246 describe associations from A to B, from B to C, and from G to Q, respectively. Other trigger-target associations 248 include associations from C to D, and so on. Likewise, table 250 includes trigger-target association 252 to describe an association from A to X, and table 260 includes trigger-target association 262 to describe an association from A to L.

FIG. 2 shows that tables 240, 250 and 260 are respectively identified as "way 0," "way 1," and "way 2," which describes the relative positions of multiple trigger-target associations in target cache 230 for the same trigger address. Priority adjuster 224 assigns priorities to trigger-target associations, and thus predictions, typically by associating memory locations with priority. In this case, way 0 is associated with the highest priority, way 1 with the second highest, and so on. In this example, trigger-target association 242 of table 240 indicates that the association from A to B is a higher priority than the association from A to X, which is trigger-target association 252 of table 250. So after target cache 230 includes these associations, the next time nonsequential prediction engine 220 detects address A, then nonsequential prediction engine 220 can provide one or more predictions. Typically, nonsequential prediction engine 220 generates nonsequential predictions generated in order of priority. Specifically, nonsequential prediction engine 220 generates predictions having the highest priority before generating predictions of lower priority. As such, nonsequential prediction engine 220 can generate a configurable number of the predictions based on priority. For example, nonsequential prediction engine 220 can limit the number of predictions to two: leg 0 and leg 1 (i.e., top two trigger-target associations). This means that in some cases, nonsequential prediction engine 220 will be more inclined to provide address B rather than address X due to the relative priorities of the tables. Note that relative priorities among trigger-target associations are just that—relative. This means that target cache 230 can position a highest priority association for a specific trigger address, for example, at way 4 and position the second highest priority association at way 9. But note that target cache 230 can include any arbitrary quantity of "legs," beyond that just of leg 0 and leg 1, from one address.

Figure 3:
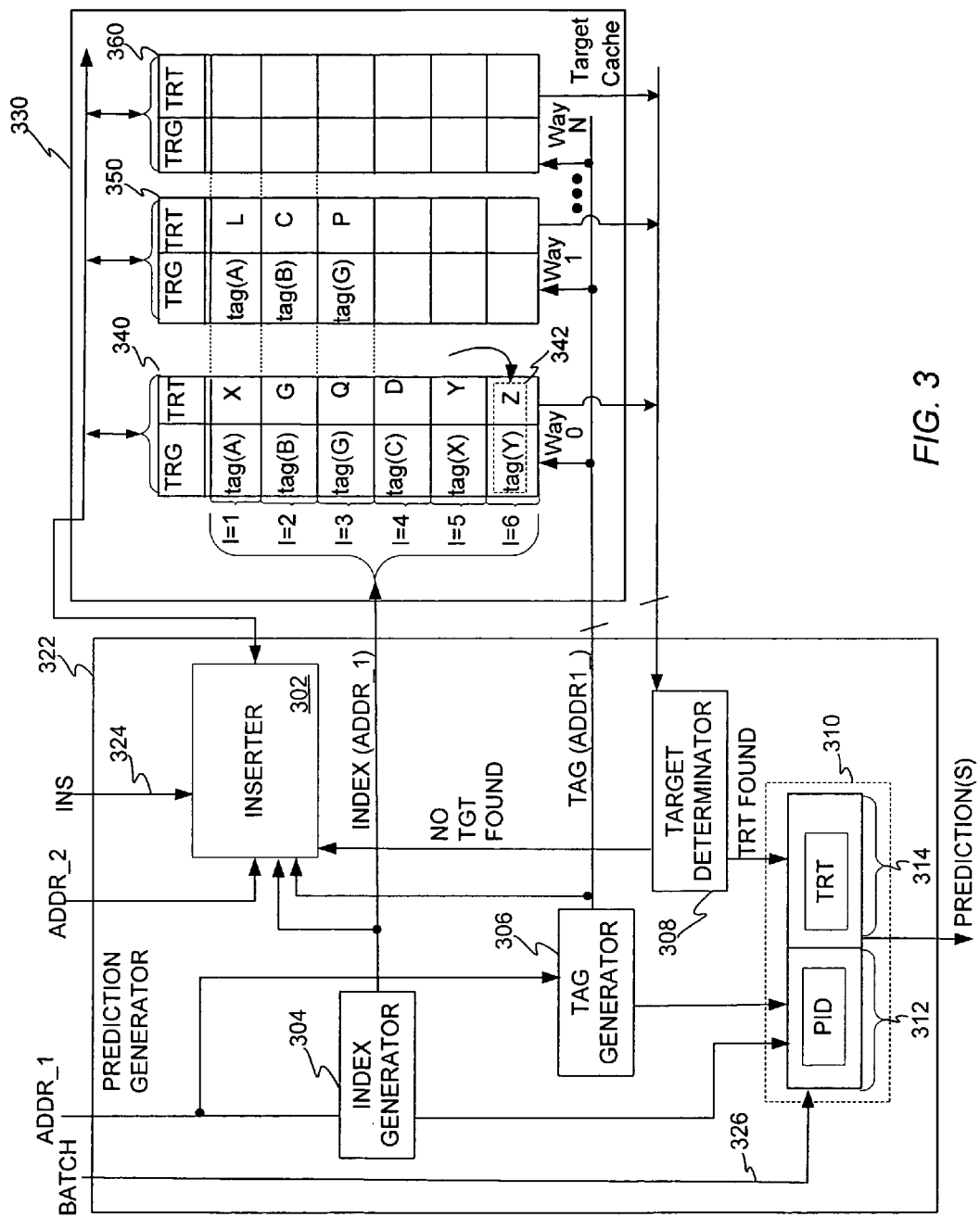
FIG. 3 illustrates an exemplary prediction generator, according to an embodiment of the present invention.

FIG. 3 illustrates an exemplary prediction generator 322, according to an embodiment of the present invention. In this example, prediction generator 322 is coupled to a target cache 330 to generate predictions as well as to manage trigger-target associations stored therein. Prediction generator 322 includes an index generator 304, a tag generator 306, a target determinator 308 and a combiner 310. Also, prediction generator 322 includes an inserter 302 for inserting discovered trigger-target associations into target cache 330.

When generating predictions, index generator 304 and tag generator 306 respectively operate to create an index and a tag for representing a first address "addr_1," which can be an address that precedes other addresses. Index generator 304 forms an index, "index(addr_1)," from addr_1 to access a subset of memory locations in target cache 330. Typically, the value of index(addr_1) selects each corresponding memory location of each selected way. Further, tag generator 306 forms a tag "tag(addr_1)" so that prediction generator 322 can access specific trigger-target associations in target cache 330 that are associated with addr_1.

As an example, consider that addr_1 is "G." With this address, prediction generator 322 generates index(G) to select memory locations associated with that index. In this instance, index(G) has a value "I," which is three (i.e., I=3). This means that index(G) can be used to select each memory location identified by I=3 for way ("way 0") 340, way ("way 1") 350, through to way ("way N") 360, where N is a configurable number representing the number of ways available in target cache 330. For the same address G, tag generator 306 will create a tag of address G as tag(G) to identify specific memory locations associated with G. So, given an index of index(G) and a tag of tag(G), target addresses Q and P (or alternate representations thereof) can be retrieved from or stored at respective memory locations in way 340 and way 350, as is shown in FIG. 3. In a specific embodiment, each address consists of 36 bits. Bits 28:18 can represent a tag for an address and any group of bits 19:9, 18:8, 17:7 or bits 16:6 can represent a configurable index for that address. In one embodiment, a portion of an address alternately represents a target address. For example, bits 30:6 of a 36-bit target address are maintained in TRT columns of target cache 330. With reduced representations of both target and trigger address, less hardware is required, thereby reducing costs in terms of material, resources, etc.

Target determinator 308 determines whether a trigger-target association exists for a particular trigger, and if so, then it determines each target address for that trigger. Continuing with the previous example, target determinator 308 retrieves target addresses Q and P in response to tag(G) being matched against the tags at index(G) that represent other trigger addresses. An ordinarily skilled artisan should appreciate that well known comparator circuits (not shown) are suitable for implementation in either prediction generator 322 or target cache 330 to identify matching tags. When one or more target addresses have been found, those addresses are passed to combiner 310. Combiner 310 associates each target address 314 with a prediction identifier ("PID") 312, which is composed of an index and tag of the trigger address. PID 312 identifies the trigger address that caused target addresses Q and P to be predicted. So, if PID 312 can be represented as [index(G),tag(G)], then a nonsequential prediction generated by prediction generator 322 will have a form of [[index(G), tag(G)],Q] as a reference. Note that Q, as a prediction, is considered a "referenced prediction" when [index(G),tag(G)] is associated thereto. The predictive information prefetched into a cache memory, therefore, can be represented as data (Q)+[[index(G),tag(G)],Q].

Combiner 310 can be configured to receive a "batch" signal 326 for generating a number of additional predictions that are nonsequential to the trigger address. For example, consider that batch signal 326 instructs combiner 310 to generate "n" predictions as a group of predictions having a range that includes the matched target address. So if trigger address "G" generates a nonsequential prediction of address "Q" (i.e., Q0 as base address), then the predicted addresses can include Q0, Q1, Q2, . . . Qb, where b is a number set by the batch signal. Note that in some cases where a back sector or a blind back sequential prediction is generated concurrently, then batch, b, can be set to b−1. As such, the group of predicted addresses would include Q(−1), Q0, Q1, Q2, . . . Q(b−1). Note that each in the group of predicted addresses can also be associated with PID 312. In a specific embodiment, target address 314 inherits attributes of the trigger address, where such attributes indicate whether the trigger address is associated with code or program data, and whether the trigger address is a processor demand address or not. In another specific embodiment, fewer than the number of predicted addresses in a group can also be associated with PID 312. In one example, only target address Q0 is associated with PID 312, while one or more of the others of the group (e.g., Q(−1), Q2, Q3, etc.) need not be associated with PID 312. As such, when trigger address G is encountered, followed by target address Q0, then PID 312 gets reported to the non-sequential predictor. Later, when Q2 or any others of the group are encountered, PID 312 does not get reported. This reduces the number of redundant entries in the target cache. Accordingly, only the association "G–>Q0" is stored and re-prioritized as a result of a hit on that prediction. When address Q1 is detected in the address stream, the non-sequential predictor will need not have to insert association "G–>Q1."

Next, consider that target determinator 308 does not detect a target address for addr_1. Target determinator 308 then communicates to inserter 302 that no trigger-target association exists for addr_1. In response, inserter 302 forms a trigger-target association for addr_1 and inserts that association into target cache 330. To do so, inserter 302 first identifies a memory location using index(addr_1) with which to store tag(addr_1). Inserter 302 is also configured to receive a subsequent address, "addr_2," to store as a target address to trigger address addr_1. As no trigger-target association existed prior to the newly-formed trigger-target association, inserter 302 stores tag(addr_1) and addr_2 respectively in the TRG column and TGT column of way 340, which is the highest priority way (i.e., way 0). For example, consider that for address stream 204 of FIG. 2, this stream shows the first instance where "Z" follows "Y." After determining that no "tag(Y)-to-Z" trigger-target association exists, inserter 302 of FIG. 3 then stores the new trigger-target association at index (Y). As such, "tag(Y)-to-Z" is stored as trigger-target association 342 in way 340. In a specific embodiment, inserter 302 receives an insertion signal ("INS") 324 from priority adjuster 424, which is described next.

Figure 4:
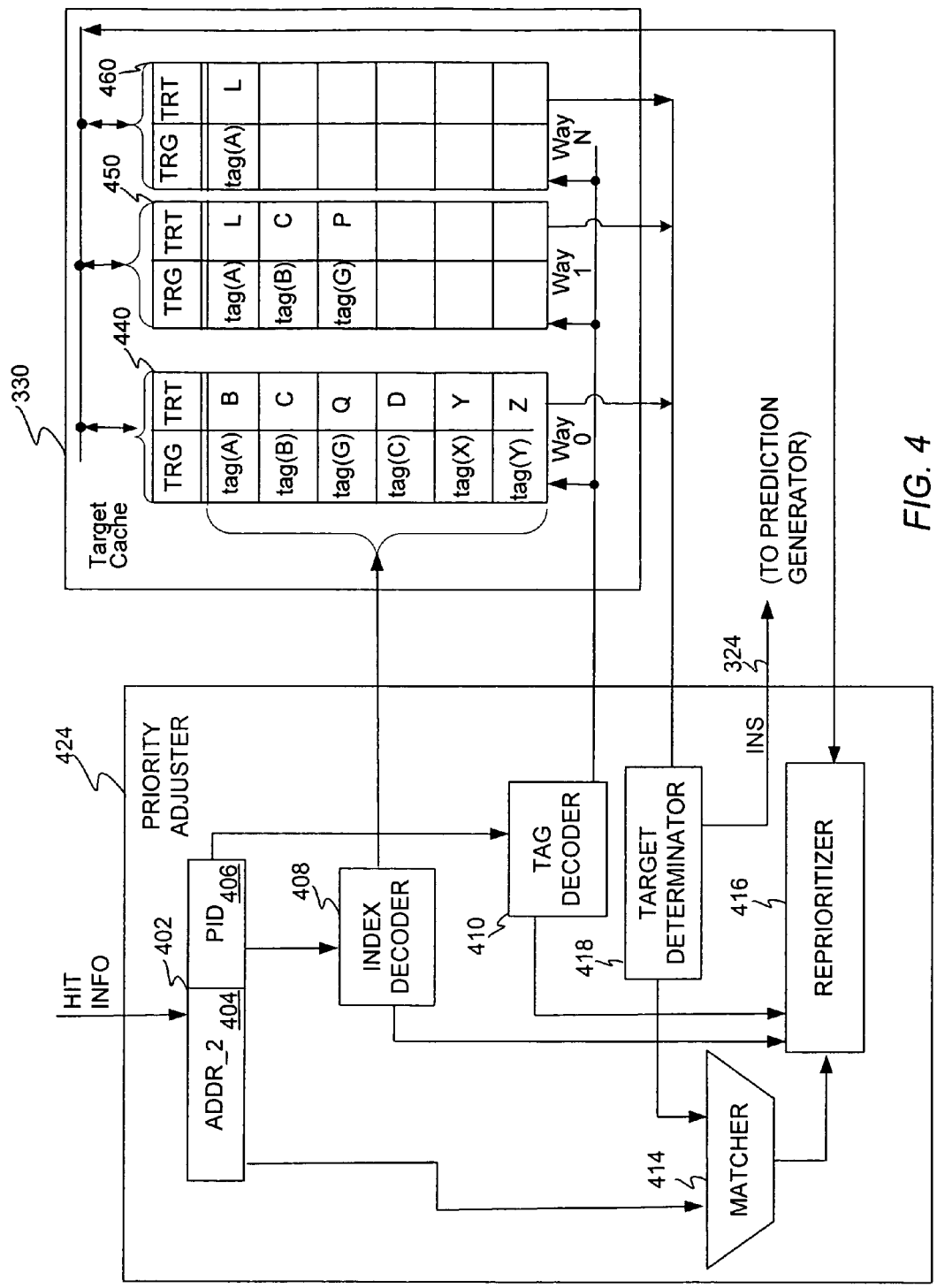
FIG. 4 illustrates an exemplary priority adjuster, according to a specific embodiment of the present invention.

FIG. 4 illustrates an exemplary priority adjuster 424, according to an embodiment of the present invention. Generally, priority adjuster 424 operates to prioritize the trigger-target associations from the most recent, successful target addresses to the least recent or successful. For example, a trigger-target association will be assigned a highest priority (i.e., stored in way 0) when no previous target existed for a particular. Further, a trigger-target association can be assigned a highest priority when the predicted target address is proved successful (e.g., there has been a read of data by a processor, where the data was prefetched based on a nonsequential prediction). In this example, priority adjuster 424 is coupled to target cache 330 to, among other things, prioritize trigger-target associations stored therein. Priority adjuster 424 includes a register 402, an index decoder 408, a tag decoder 410, a target determinator 418, a matcher 414 and a reprioritizer 416.

Generally, priority adjuster 424 receives information external to nonsequential predictor 110 indicating that a particular address was successful in providing data requested by a processor. Such information can be generated by a cache memory, such as multi-level cache 140 described in FIG. 1. Priority adjuster 424 receives this information into register 402 as "Hit Info." Hit Info is a reference that includes at least the address 404 of the data (e.g., program instructions and/or program data actually requested by a processor). Address 404 is labeled as addr_2. The reference also includes PID 406 associated with address 404.

Index decoder 408 and tag decoder 410 respectively extract index(addr_1) and tag(addr_1) from PID 406 to determine whether addr_2 has the appropriate level of priority. To do so, priority adjuster 424 identifies whether addr_2 is a target address of an existing trigger-target association in target cache 330. After priority adjuster 424 applies tag(addr_1) and index(addr_1) to target cache 330, any matching trigger addresses in TRG columns of target cache 330 will be received by target determinator 418. Upon detecting one or more target addresses associated to addr_1, target determinator 418 provides those target addresses to matcher 414.

But if target determinator 418 determines that no target address exists in a trigger-target association (i.e., there is not any addr_2 associated with address addr_1), then it will communicate an insert signal ("INS") 324 to inserter 302 of FIG. 3 to insert a new trigger-target association. Insert signal 324 typically includes address information, such as addr_1 and addr_2. Typically in situations where no matching target address exists for PID 406 of the Hit Info means that a processor has hit upon a previously issued nonsequential prediction. But target cache 330 has since purged the trigger-target association that formed the basis for that previously issued nonsequential prediction. As such, nonsequential prediction engine 110 will insert, or reinsert, a trigger-target association that can again be used to predict the nonsequential address that was successfully used by a processor.

When target determinator 418 does detect one or more target addresses, it provides the detected target addresses to matcher 414. Matcher 414 compares each detected target address against addr_2 (i.e., address 404) to determine how many associated target addresses exist for addr_1, and for each existing target address, the way in which a corresponding trigger-target association resides. Matcher 414 provides the results of its comparisons to reprioritizer 416 to modify priorities, if necessary.

First, consider an instance where one or more target addresses have been detected as being associated with PID 406 (i.e., addr_1), which represents addr_1 as the trigger address, but there is no trigger-target association that includes addr_2. So, reprioritizer 416 will insert a new trigger-target association into a position representing a highest priority (e.g., way 0) and will demote the priorities of existing trigger-target associations of the same trigger. For example, consider that as shown in FIG. 3 a "tag(A)-to-X" trigger-target association is at a memory location representing a highest priority, whereas a "tag(A)-to-L" association has a lower priority. Next, assume that PID 406 represents address A as addr_1 and addr_2 is address B. Reprioritizer 416 will operate to store, as shown in FIG. 4, a "tag(A)-to-B" association in way 0, with the other previous associations stored in other ways, which are of lower priority.

Second, consider an instance where two target addresses have been detected as being associated with PID 406 (i.e., addr_1), but the two trigger-target associations have their priorities improperly swapped. In this case, reprioritizer 416 will insert the highest priority trigger-target association into a position representing a highest priority (e.g., way 0) and will insert the previous highest priority trigger-target association into another position representing a second highest priority (e.g., way 1). For example, consider that as shown in FIG. 3 a "tag(B)-to-G" trigger-target association is at a memory location representing a highest priority whereas a "tag(B)-to-C" association has a lower priority. Next, assume that PID 406 represents address B as addr_1 and address C is addr_2. Reprioritizer 416 will operate to store, as shown in FIG. 4, a "tag(B)-to-C" association in way 0, with the other association in way 1, which is of lower priority. Note this technique of prioritization is useful if at least the two top-most priorities are kept as "leg 0" and "leg 1," as the highest and second highest priories, respectively.

Next, consider an instance where two target addresses have been detected as being associated with PID 406 (i.e., addr_1), and the two trigger-target associations have their priorities properly assigned. In this case, reprioritizer 416 takes no action as the corresponding trigger-target associations are correct.

Figure 5:
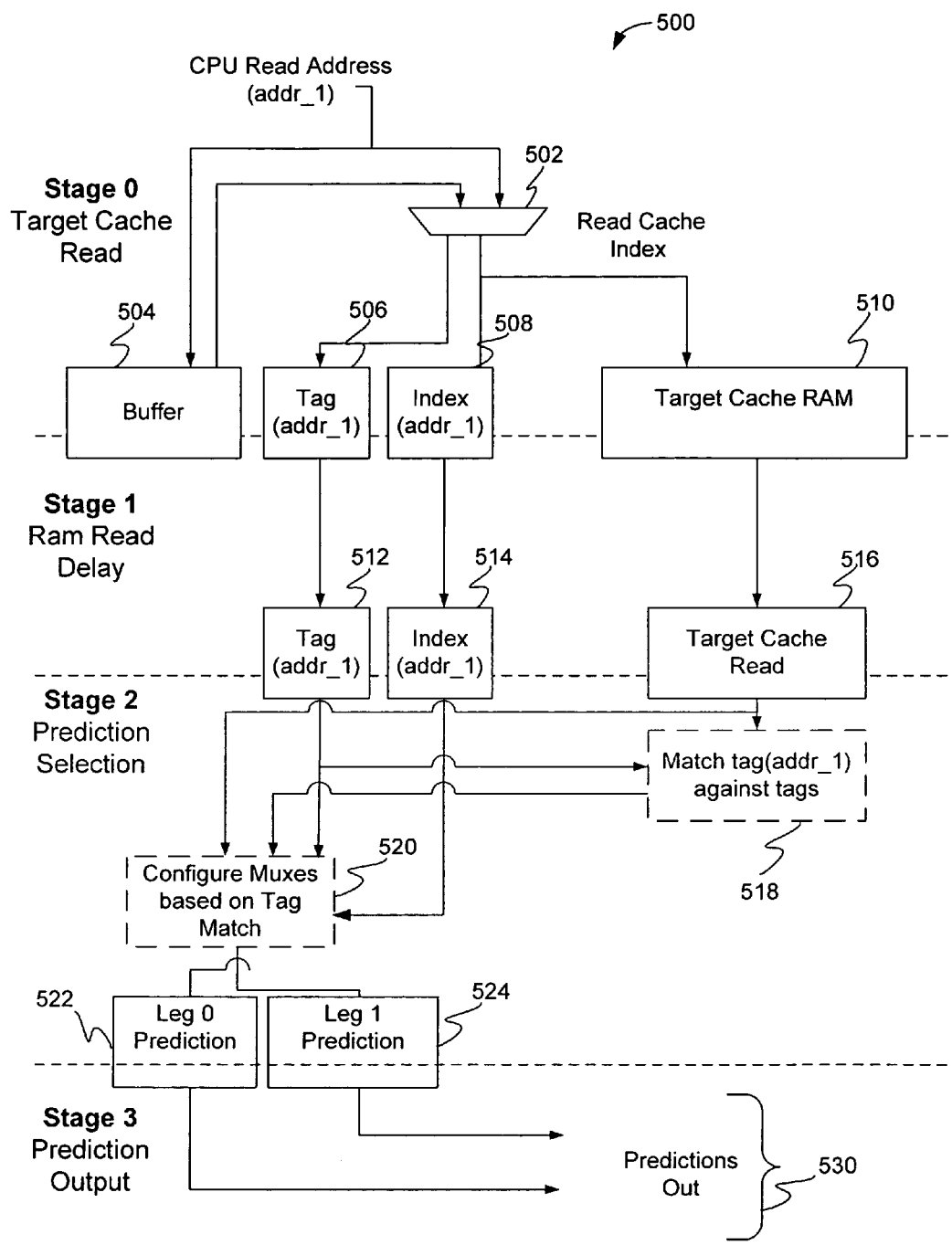
FIG. 5 depicts an exemplary pipeline for operating a nonsequential predictor generator when forming nonsequential predictions, according to a specific embodiment of the present invention.

FIG. 5 depicts an exemplary pipeline 500 for operating a predictor generator to form nonsequential predictions, according to a specific embodiment of the present invention. In FIG. 5, solid-lined boxes represent storage during or between stages and broken-lined boxes represent actions performed by a nonsequential predictor. During Stage 0, addr_1 of a read request is decoded by combined-tag-and-index generator 502, which can be an amalgam of index decoder 408 and tag decoder 410 of FIG. 4. In one embodiment, combined-tag-and-index generator 502 is a multiplexer configured to separate addr_1 into a first part of the address and second part of the address. The first part is held as tag(addr_1) at 506 and the second part is held as index(addr_1) at 508. Also during this stage, index(addr1) is applied to a target cache at 510 to retrieve data describing trigger-target associations. Optionally, addr_1 of a read request can be temporarily stored in buffer 504 while a target cache is being written.

During Stage 1, tag(addr_1) and index(addr_1) remain held respectively at 512 and at 514. At 516, target addresses are read from the target cache. During Stage 2, a nonsequential prediction engine selects suitable nonsequential predictions by first matching tag(addr_1) against the tags associated with index(addr_1) at 518. At 520, a nonsequential prediction engine configures multiplexers, for example, to transfer the highest priority target address (i.e., from a way storing the highest priority trigger-target association) into a leg 0 prediction queue at 522 and to transfer the second highest priority target address (i.e., from a way storing the second highest priority trigger-target association) into a leg 1 prediction queue at 524. During Stage 3, these two nonsequential predictions are output at 530 to a combiner, for example. Note that although FIG. 5 generates nonsequential predictions in four stages, other nonsequential prediction pipelines of other embodiments can have more or fewer stages.

Figure 6:
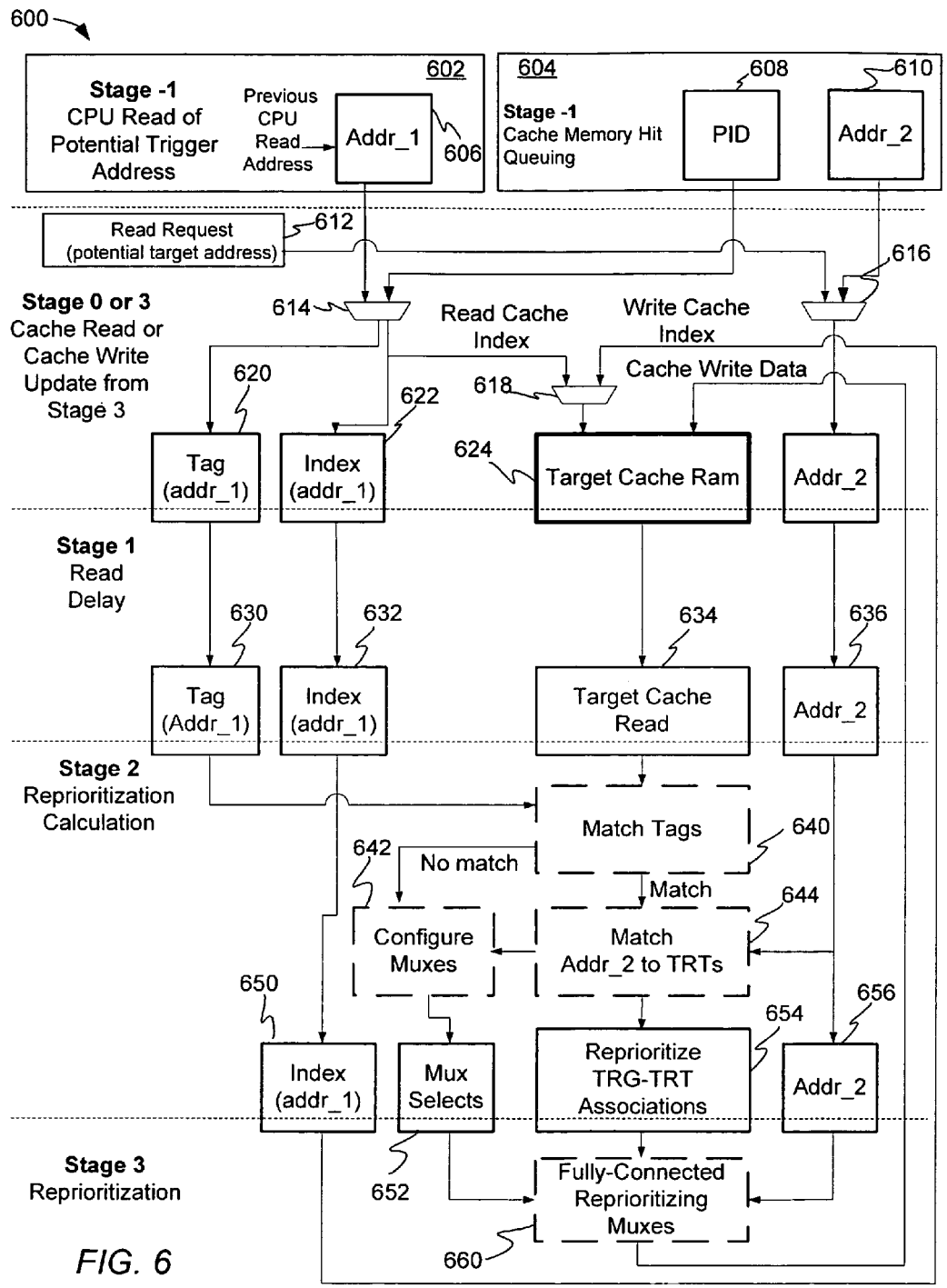
FIG. 6 depicts an exemplary pipeline for operating a priority adjuster to prioritize nonsequential predictions, according to a specific embodiment of the present invention.

FIG. 6 depicts an exemplary pipeline 600 for operating a priority adjuster to prioritize nonsequential predictions, according to a specific embodiment of the present invention. Solid-lined boxes represent storage during or between stages and broken-lined boxes represent actions that can be performed by a priority adjuster. Pipeline 600 depicts an exemplary method of inserting trigger-target associations into a target cache and reprioritizing target cache associations. Stage-1 determines whether the priority adjuster will insert or prioritize. If the priority adjuster is going to perform an insertion, then address addr_1 of a read request at 602 is stored at 606 during this stage. This address has the potential to be a trigger address for a target address. If the priority adjuster is going to perform a prioritization, then at 604 the priority adjuster receives a PID 608 representing addr_1 address from an external source (e.g., a cache memory), and also receives address addr_2 at 610 during this stage.

Note that FIGS. 5 and 6 exemplify nonsequential prediction using one level of prediction. To effectuate multi-level prediction generation, exemplary pipelines 500 and 600 can be modified to feed the generated predictions at the end of respective pipelines 500 and 600 back into pipelines 500 and 600 as input addresses. These predictions then are queued up for another level of prediction generation. For example, if A is detected, then target cache 230 produces target addresses B and X (e.g., as two highest priority ways). Then, address B as a successive trigger address is input back into the top of the pipeline, whereby target cache 230 produces address C and G. In short, a feedback loop can be added to exemplary pipelines 500 and 600 to implement more than one level of prediction.

First consider that during Stage 0, the priority adjuster is performing a trigger-target association insertion. In this instance, addr_1 is decoded by combined-tag-and-index generator 614, and addr_2 is selected from 612 through multiplexer 616. Combined-tag-and-index generator 614 performs a collective function of an index generator and a tag generator. In one embodiment, combined-tag-and-index generator 614 is a multiplexer configured to select an address from either 606 or 608. In this case, combined-tag-and-index generator 614 forms a first address part, which is held as tag(addr_1) at 620, and forms a second part, which is held as index(addr_1) at 622. Also during this stage, index(addr1) is applied via multiplexer 618 to a target cache at 624 to retrieve data describing trigger-target associations. Next, consider that during Stage 0, the priority adjuster is performing a prioritization of a target cache. In this instance, addr_1 (or its alternative representation) is received from 608 and addr_2 is selected from 610 through multiplexer 616. Combined tag and index generator 614 then forms a first and second parts from PID 608. Index(addr_1) formed from PID 608 is then applied via multiplexer 618 to a target cache at 624 to retrieve data describing trigger-target associations. From Stage 1 to Stage 3, pipeline 600 behaves similarly regardless of whether the priority adjuster is performing an insertion or a prioritization.

During Stage 1, tag(addr_1) and index(addr_1) remain held respectively at 630 and at 632. At 634, target addresses are read from the target cache. During Stage 2, a priority adjuster first matches tag(addr_1) against the tags. If at 640 no tags match, then multiplexers are configured at 642 to prepare for inserting a trigger-target association. But if at least one tag from the ways of the target cache matches at 644, and if the highest priority trigger-target association does not reside in a way corresponding to the highest priority, then trigger-target associations are reprioritized at 654. To do this, multiplexers are selected at 652 to reprioritize or insert a new trigger-target association. During Stage 3, fully-connected reprioritizing multiplexers are configured to store addr_2 from 656. This address will be written as a target address at way 0 during stage 0, as determined by index(addr_1) held at 650. As is shown, other trigger-target associations as determined by fully-connected reprioritizing multiplexers at 660, are also written as cache write data into the target cache at 624 using index(addr_1) held at 650. After pipeline 600 returns to Stage 0, the priority adjuster continues to operate accordingly.

In a specific embodiment of the present invention, prefetcher 106 of FIG. 1, which includes nonsequential predictor 110, is disposed within a Northbridge-Southbridge chipset architecture, such as within a memory processor having at least some of the same functionalities of a Northbridge chip. A memory processor is designed to at least control memory accesses by one or more processors, such as CPUs, graphics processor units ("GPUs"), etc. In a Northbridge implementation, prefetcher 106 can also be coupled via an AGP/PCI Express interface to a GPU. Moreover, a front side bus ("FSB") can be used as a system bus between a processor and a memory. Also, a memory can be a system memory. Alternatively, nonsequential predictor 110 can be employed in any other structure, circuit, device, etc. serving to control accesses to memory, as does memory processor. Further, nonsequential predictor 110 and its elements, as well as other components of prefetcher 106, can be composed of either hardware or software modules, or both.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A prefetcher for predicting accesses to a memory comprising:
   a prediction generator configured to generate a plurality of nonsequential predications unpatternable to an address;
   a target cache including a number of prioritized ways, the target cache coupled to said prediction generator to maintain associations between each trigger address and one or more corresponding target addresses with each association corresponding to a nonsequential prediction, the target cache configured to store a plurality of trigger-target associations for a trigger address in an arrangement that determines a priority wherein a trigger-target association stored in a first way is associated with a higher priority than another trigger-target association stored in a second way; and
   a priority adjuster to discover trigger-target associations, prioritize the trigger-target associations from the most recent, successful target addresses to the least recent, successful target addresses, and in response to detecting two target addresses with priorities improperly swapped, reprioritize trigger-target associations by inserting a highest priority trigger-target association into a highest priority way and inserting a previous highest priority trigger-target association into a second highest priority way, wherein the priority adjuster receives an indication of success of target addresses in providing data requested from said memory;

the prefetcher using the prioritized trigger-target associations to generate a configurable number of predictions in order of priority for a selected address.

2. The prefetcher of claim 1 wherein said prediction generator further comprises a combiner configured to append a representation of said selected address to one of said configurable number of predictions to form a referenced prediction.

3. The prefetcher of claim 2 wherein said priority adjuster is configured to decode a reference and to determine whether a prediction corresponding to said reference is stored in a highest priority position.

4. The prefetcher of claim 3 wherein said priority adjuster inserts said prediction into said highest priority position if associations between said selected address and either said prediction or any of said other predictions are not stored in said target cache.

5. The prefetcher of claim 3 wherein said priority adjuster receives said reference if prefetched information based on said prediction is requested.

6. The prefetcher of claim 1 wherein said prediction generator further comprises an inserter for inserting an association between said selected address and a next prediction.

7. A nonsequential predictor for predicting accesses to a memory comprising:
   a prediction generator configured to generate indexes and tags from addresses, the prediction generator generating a plurality of nonsequential predications for an address;
   a target cache including a number of prioritized ways, the target cache coupled to said prediction generator to store a plurality of trigger-target associations for a trigger address, said target cache including a number of ways each having memory locations for storing trigger-target associations each trigger-target association corresponding to a nonsequential prediction;
   wherein a trigger-target association stored in a first way is associated with a higher priority than another trigger-target association stored in a second way; and
   a priority adjuster to discover trigger-target associations, prioritize the trigger-target associations from the most recent, successful target addresses to the least recent, successful target addresses, and in response to detecting two target addresses with priorities improperly swapped, reprioritize trigger-target associations by inserting a highest priority trigger-target association into a highest priority way and inserting a previous highest priority trigger-target association into a second highest priority way, wherein the priority adjuster receives an indication of success of target addresses in providing data requested from said memory;
   the non-sequential predictor using the prioritized trigger-target associations to generate predictions in order of priority to generate a configurable number of predictions in order of priority for a selected address.

8. The nonsequential predictor of claim 7 wherein each of said trigger-target associations includes a tag and at least a portion of a target address, wherein said tag is representative of a trigger address.

9. The nonsequential predictor of claim 8 wherein a tag size of said tag and a portion size of said portion are configured to minimize size requirements for a memory location.

10. The nonsequential predictor of claim 7 wherein said prediction generator is configured to compare a first address tag against each tag identified by an index to detect any trigger-target association that includes said first address tag.

11. The nonsequential predictor of claim 7 wherein said prediction generator uses a target address as a successive trigger address to form additional nonsequential predictions based on one or more other trigger-target associations, wherein each of said one or more other trigger-target associations relate to lower levels in said target cache than either said trigger-target association or said another trigger-target association.

12. The nonsequential predictor of claim 7 wherein said priority adjuster is configured to modify a priority for one of said trigger-target associations that includes a target address that matches a second address, said target address being identified by a trigger address composed of an index and a first address tag.

13. The nonsequential predictor of claim 7 wherein said target cache is a single-ported memory.

14. The nonsequential predictor of claim 7 wherein said target cache further comprises two or more ways in which to store said another trigger-target association.

15. A computing system configured to manage accesses to a memory comprising:
   a central processing unit for executing program instructions and processing program data;
   a system memory containing said program instructions and said processing program data; and
   a memory processor coupled to said central processing unit and said system memory and configured to control predictive accesses to said system memory, said memory processor including:
   a prediction generator configured to generate indexes and tags from addresses, the prediction generator generating a plurality of nonsequential predications for a trigger address;
   a target cache including a number of prioritized ways each having memory locations storing trigger-target associations, wherein a trigger-target association stored in a first way is associated with a higher priority than another trigger-target association stored in a second way each trigger address having one or more associated target addresses, with each target address associated with a trigger address corresponding to a nonsequential prediction wherein a trigger-target association stored in a first way is associated with a higher priority than another trigger-target association stored in a second way,
   a priority adjuster configured to modify a priority for one of said trigger-target associations having a target address that matches a second address, said priority adjuster to discover trigger-target associations, prioritize the trigger-target associations from the most recent, successful target addresses to the least recent, successful target addresses, and in response to detecting two target addresses with priorities improperly swapped, reprioritize trigger-target associations by inserting a highest priority trigger-target association into a highest priority way and inserting a previous highest priority trigger-target association into a second highest priority way, wherein the priority adjuster receives an indication of success of target addresses in providing data requested from said memory; and
   a cache memory configured to communicate a reference to said priority adjuster when said central processing unit requests predictive information associated with said reference;
   the memory processor using the prioritized trigger-target associations to generate predictions in order of priority to generate a configurable number of predictions in order of priority for the same trigger address.

* * * * *